United States Patent [19]

Green et al.

[11] Patent Number: 5,155,444
[45] Date of Patent: Oct. 13, 1992

[54] TRIM BAR GAP VERIFICATION TOOL AND METHOD USING A FLEXIBLE CAPACITOR SENSOR HAVING A MAGNETIC METALLIC LAMINATE

[75] Inventors: William J. Green, Webster; Stephen D. Cipolla, Penfield, both of N.Y.

[73] Assignee: Xerox Corporation, Stamford, Conn.

[21] Appl. No.: 748,589

[22] Filed: Aug. 22, 1991

[51] Int. Cl.$^5$ .......................... G01R 27/26; G01B 7/14
[52] U.S. Cl. ..................................... 324/662; 324/661; 324/690; 355/208
[58] Field of Search ............... 324/661, 662, 686, 690, 324/454, 455, 452, 207.22, 207.26, 207.11, 229, 230, 231; 355/208, 209, 245, 251, 259; 118/657, 658

[56] References Cited

U.S. PATENT DOCUMENTS

| | | | |
|---|---|---|---|
| 3,030,578 | 4/1962 | Lessman | 324/662 |
| 3,048,775 | 8/1962 | Calvert | 324/662 |
| 3,662,576 | 5/1972 | Girlatschek | 324/229 X |
| 4,063,167 | 12/1977 | Duly | 324/687 |
| 4,311,959 | 1/1982 | Riessland et al. | 324/662 |
| 4,823,071 | 4/1989 | Ding et al. | 324/662 |
| 4,935,700 | 6/1990 | Garbini et al. | 324/662 |

Primary Examiner—Gerard R. Strecker
Assistant Examiner—Diep Do
Attorney, Agent, or Firm—Oliff & Berridge

[57] ABSTRACT

A method for measuring the gap between a roller and an adjacent member in an electrophotographic printing machine is disclosed wherein a flexible sensor is provided and passed into the developer sump area in the printing machine. The flexible sensor is passed between the roller and adjacent member for measuring the distance therebetween. The flexible sensor is comprised of a capacitance sensor and a metal laminate. As the sensor is passed between the roller and adjacent member, the sensor is magnetically attracted to the roller and conforms to the circumference of the roller. The adjacent member can be a trim bar within the developer sump.

34 Claims, 4 Drawing Sheets

TRIM BAR GAP VERIFICATION TOOL AND METHOD USING A FLEXIBLE CAPACITOR SENSOR HAVING A MAGNETIC METALLIC LAMINATE

BACKGROUND OF THE INVENTION

This invention relates generally to an electrophotographic printing machine, and more particularly concerns a method and tool for measuring the gap between the trim bar and magnetic roll.

In an electrophotographic printing machine, a photoconductive member is charged to a substantially uniformed potential to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing a developer material into contact therewith. This forms a powder image on the photoconductive member which is subsequently transferred to a copy sheet. The copy sheet is heated to permanently affix the marking particles thereto in image configuration.

In the foregoing type of printing machine, a development system is employed to deposit developer material onto the electrostatic latent image recorded on the photoconductive surface. Generally, the developer material has toner particles adhering triboelectrically to coarser carrier granules. Typically, the toner particles are made from a thermoplastic material while the carrier granules are made from a ferromagnetic material. Alternatively, a single component magnetic material may be employed. A continuous supply of toner particles must be available to be capable of copying a large number of original documents or producing multiple copies of the same original document. This is necessary in order to ensure that the machine is not shut down at relatively short intervals due to the lack of toner particles. This is achieved by storing a supply of toner particles in a toner container and dispensing additional toner particles into one end of the developer housing chamber. The toner particles are then transported across the chamber of the developer housing and advanced to a developer roller. The developer roller transports the toner particles closely adjacent to the photoconductive member and the latent image attracts toner particles thereto.

In magnetic roll developing, a hollow tube or roll containing fixed magnets is used to move the developer to the photoreceptor. As the tube rotates around the magnets and through a sump of developer, the magnets attract the metallic carrier beads in the developer. The carrier beads closest to the magnetic roll become magnetized, enabling more carrier beads to stick. As a result, the developer builds up to form bristles like a brush. This attraction of developer to the magnetic roll is called a magnetic brush. The magnetic force on the magnetic roll is just enough to allow the developer to build up on the roll. The magnetic force has little effect on the charge either on the toner or on the photoreceptor.

As the magnetic roll or tube continues to rotate, it moves the developer brush past a trim bar. The trim bar limits the length of the brush by knocking off the portions of the developer bristles that extend beyond a certain length. The trim bar ensures that just the tip of the brush touches the photoreceptor.

The gap between the trim bar and the magnetic roll must be exactly determined so that neither too much nor too little developer material is brought in contact with the photoreceptor surface. If the exact amount of developer material is not precisely metered by the trim bar, the print quality of the final printed product can suffer.

U.S. Pat. No. 4,823,071 to Ding et al. discloses a capacitive measuring system for measuring the distance between two relatively moving parts based on the measurement of capacitive charge, comprising a measuring sensor which forms one plate of the capacitor whose gap is to be measured. The position of the sensor face in the fixed part of the casing is known, thus the plate distance of the gap provides a direct measurement of the gap.

U.S. Pat. No. 4,311,959 to Riessland et al. discloses a capacitive probe with a special shielding which allows measurement of small differences in distance which correspond to small differences in capacitance. A first and second electrode are located within the shield which protects a coupling pin from the shield. The shield has a decoupling projection between the first and second electrodes so that the capacitance between the electrodes and between the shield and coupling pin are very small. With the capacitive measuring probe, distances to a conductive material are measured, as well as the position of the bordering edges of the conductor material.

U.S. Pat. No. 4,063,167 to Duly discloses an apparatus for the non-contact measurement of the clearance between the blade tips of a rotating turbine and the surrounding housing, by the use of a capacitance probe. The probe consists of two metallic conductors insulated from one another and arranged to form the plates of the capacitor. Passing a blade tip in close proximity to the two plates of the probe changes the capacitance.

U.S. Pat. No. 3,030,5788 to Lessman discloses a device for measuring elements with accuracy of less than one millionth of an inch. The device comprises a) a carriage movable by a lead screw, b) a pair of helical capacitor plates carried by the lead screw, and c) a measuring screw driven by the lead screw and having a thread between the capacitor plates to form capacitors therewith, which may be balanced relative to one another to precisely ascertain the position of the measuring screw relative to the lead screw.

U.S. Pat. No. 4,935,700 to Garbini et al. discloses a fringe field capacitive distance sensor for measuring the distances between a probe and the surface of a conductive body over a wide range. A sensor encased in a ceramic material is comprised of a conductive plate element mounted by the probe, the thickness of the plate element being substantially less than the height and width of the plate element. The plate element is positioned adjacent to the body being measured and the fringe field capacitance between the plate and body is measured.

U.S. Pat. No. 3,048,775 to Calvert discloses an apparatus for measuring small distances and/or measuring the amplitude of mechanical vibrations. The apparatus for measuring the spacing between a pair of plates of a capacitor comprises a) a high gain amplifier arranged so that the capacitor may be connected as a feed back circuit across the amplifier to feed a current into the amplifier input dependent on the amplifier output voltage, b) a source of alternating current of constant amplitude coupled to the amplifier input in opposition to the feed back current, and c) indicating means coupled to the amplifier output.

While the above-mentioned measuring systems allow for measuring distances such as with a capacitor type sensor, there continues to be a need for a system for measuring the gap between a magnetic roller and an adjacent member, such as a trim bar.

SUMMARY OF THE INVENTION

It is an object of the present invention to provide a method and tool for measuring the gap between a magnetic roller and an adjacent member within an electrophotographic printing machine.

It is another object of the present invention to provide a method and tool for measuring the gap between a magnetic roller and the trim bar in an electrophotographic printing machine by passing a flexible sensor between the roller and adjacent member for measuring the distance therebetween.

It is still another object of the present invention to provide a method and tool for measuring the gap between the magnetic roller and trim bar wherein a flexible capacitance sensor having a metal laminate thereon is passed between the magnetic roller and trim bar such that the capacitance sensor is magnetically attracted to the roller and conforms to the circumference of the roller when a sensor is passed therebetween.

Another object of the present invention is to provide a method and tool for conveniently and easily measuring hard to reach distances within an electrophotographic printing machine.

These and other objects of the present invention are achieved by a method for measuring the gap between a roller and an adjacent member, comprising the steps of providing a flexible sensor, passing the flexible sensor between the roller and the adjacent member, and measuring the distance between the roller and the adjacent member. In particular, the flexible sensor is comprised of a capacitance sensor and a metal laminate thereon. The roller is preferably a magnetic roller such that when the flexible sensor is passed into the electrophotographic printing machine between the roller and adjacent member, the flexible sensor is magnetically attracted to the roller and conforms to the circumference of the roller when passed between the roller and adjacent member. The method can be used for measuring the gap between the magnetic roller and a trim bar, which gap is required to be within precise specifications.

BRIEF DESCRIPTION OF THE DRAWINGS

A more complete understanding can be obtained by reference to the following drawings and description, wherein.

DESCRIPTION OF THE PREFERRED EMBODIMENTS

While the present invention will hereinafter be described in connection with various embodiments thereof, it will be understood that it is not intended to limit the invention to these embodiments. On the contrary, it is intended to cover all alternatives, modifications and equivalents that may be included within the spirit and scope of the invention as defined by the appended claims.

Figure 1:
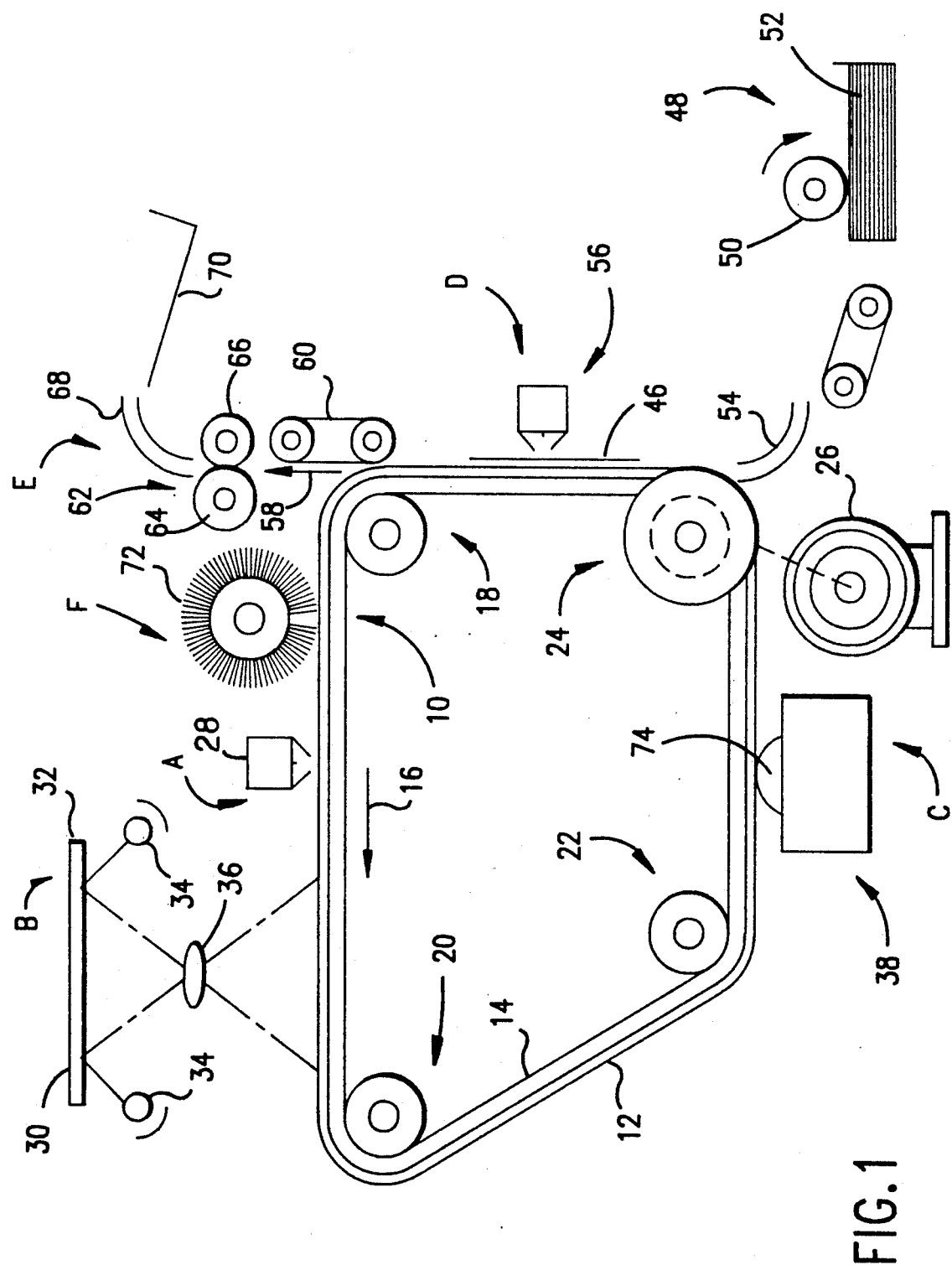
FIG. 1 is a schematic elevational view depicting an electrophotographic printing machine having a development apparatus with a magnetic roller and trim bar therein.

For a general understanding of the features of the present invention, reference is made to the drawings. In the drawings, like reference numerals have been used throughout to designate identical elements. FIG. 1 schematically depicts the various elements of an illustrative electrophotographic printing machine. It will become evident from the following discussion that the invention is equally well suited for use in a wide variety of printing machines and is not necessarily limited in its application to the particular embodiment depicted herein.

Inasmuch as the art of electrophotographic printing is well known, the various processing stations employed in the Figure printing machine will be shown hereinafter schematically and their operation described briefly with reference thereto.

Turning now to FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum allow which is electrically grounded. Other suitable photoconductive surfaces and conductive substrates may also be employed. Belt 10 moves in the direction of arrow 16 to advance successive portions of photoconductive surface 12 through the various processing stations disposed about the path of movement thereof. As shown, belt 10 is entrained about rollers 18, 20, 22 and 24. Roller 24 is coupled to motor 26 which drives roller 24 so as to advance belt 10 in the direction of arrow 16. Rollers 18, 20 and 22 are idler rollers which rotate freely as belt 10 moves in the direction of arrow 16.

Initially, a portion of belt 10 passes through charging station A. At charging station A, a corona generating device, indicated generally by the reference numeral 28, charges a portion of photoconductive surface 12 of belt 10 to a relatively high, substantially uniform potential.

Next, the charged portion of photoconductive surface 12 is advanced through exposure station B. At exposure station B, an original document 30 is positioned face down upon a transparent platen 32. Lamps 34 flash light rays onto original document 30. The light rays reflected from original document 30 are transmitted through lens 36 forming a light image thereof. Lens 36 focuses the light image onto the charged portion of photoconductive surface 12 to selectively dissipate the charge thereon. This records an electrostatic latent image on photoconductive surface 12 which corresponds to the informational areas contained within original document 50 disposed upon transparent platen 32. Thereafter, belt 10 advances the electrostatic latent image recorded on photoconductive surface 12 to development station C.

At development station C, a developer unit, indicated generally by the reference numeral 38, transports developer material of toner particles and carrier beads into contact with the electrostatic latent image recorded on photoconductive surface 12. Toner particles are attracted to the electrostatic latent image forming a toner powder image on photoconductive surface 12 of belt 10 so as to develop the electrostatic latent image.

After development, belt 10 advances the toner powder image to transfer station D. At transfer station D, a sheet of support material 46 is moved into contact with the toner powder image. Support material 46 is advanced to transfer station D by a sheet feeding apparatus, indicated generally by the reference numeral 48. Preferably, sheet feeding apparatus 48 includes a feed roll 50 contacting the upper most sheet of a stack of sheets 52. Feed roll 50 rotates to advance the upper most sheet from stack 50 into chute 54. Chute 54 directs the advancing sheet of support material 46 into contact with photoconductive surface 12 of belt 10 in a timed sequence so that the toner powder image developed thereon contacts the advancing sheet of support material at transfer station D.

Transfer station D includes a corona generating device 56 which sprays ions onto the backside of sheet 46. This attracts the toner powder image from photoconductive surface 12 to sheet 46. After transfer, the sheet continues to move in the direction of arrow 58 onto a conveyor 60 which moves the sheet to fusing station E.

Fusing station E includes a fuser assembly, indicated generally by the reference numeral 62, which permanently affixes the powder image to sheet 46. Preferably, fuser assembly 62 includes a heated fuser roller 64 and a back-up roller 66. Sheet 46 passes between fuser roller 64 and back-up roller 66 with the toner powder image contacting fuser roller 64. In this manner, the toner powder image is permanently affixed to sheet 46. After fusing, chute 68 guides the advancing sheet to catch tray 70 for subsequent removal from the printing machine by the operator.

Invariably, after the sheet of support material is separated from photoconductive surface 12 of belt 10, some residual particles remain adhering thereto. These residual particles are removed from photoconductive surface 12 at cleaning station F. Cleaning station F includes a preclean corona generating device (not shown) and a rotatably mounted fibrous brush 72 in contact with photoconductive surface 12. The pre-clean corona generator neutralizes the charge attracting the particles to the photoconductive surface. These particles are cleaned from the photoconductive surface by the rotation of brush 72 in contact therewith. Subsequent to cleaning, a discharge lamp (not shown) floods photoconductive surface 12 with light to dissipate any residual charge remaining thereon prior to the charging thereof for the next successive imaging cycle.

It is believed that the foregoing description is sufficient for purposes of the present application to illustrate the general operation of an exemplary electro-photographic printing machine incorporating the features of the present invention therein.

Figure 2:
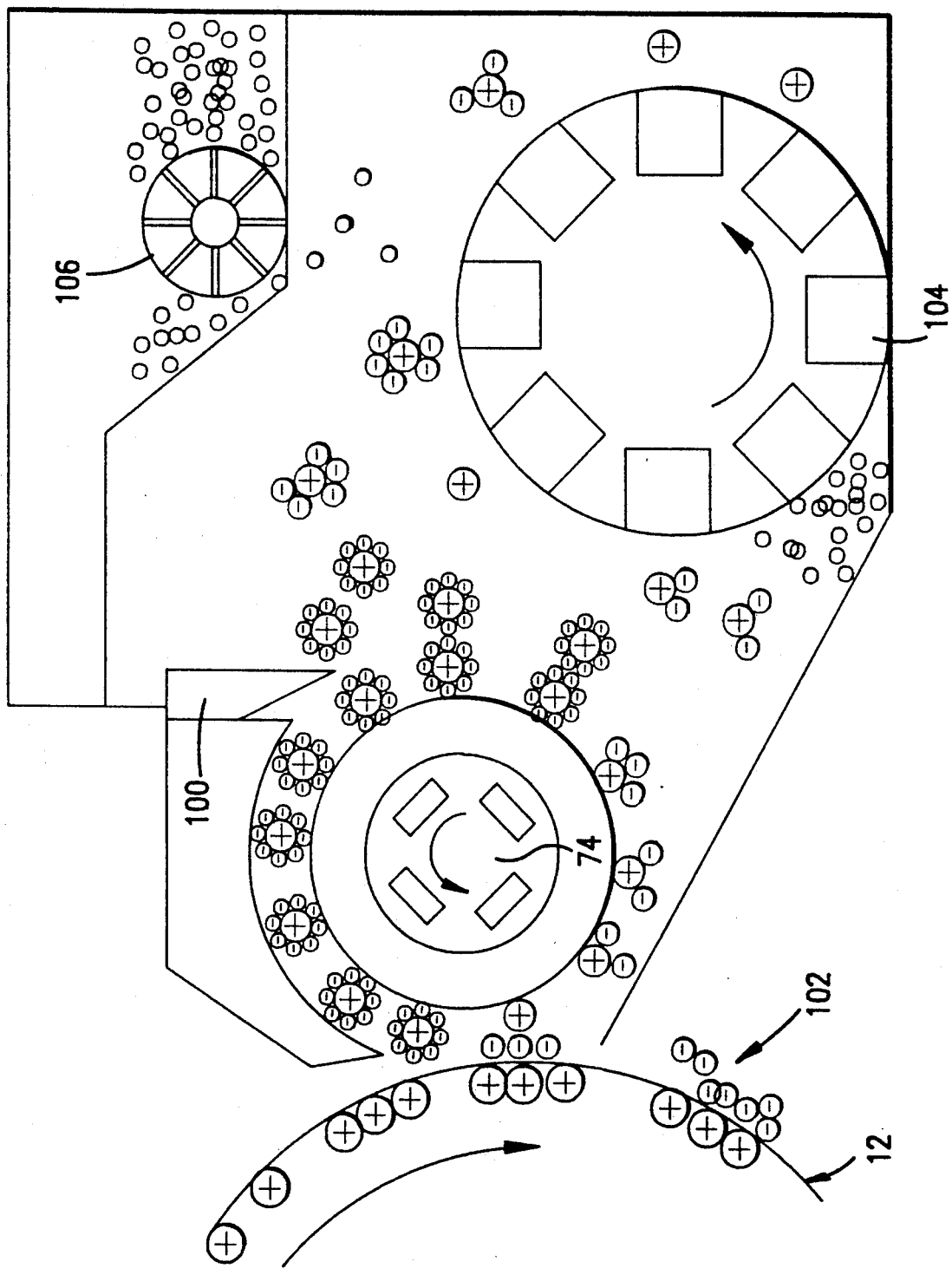
FIG. 2 is a schematic view of a development zone for magnetic roll developing.
Figure 3:
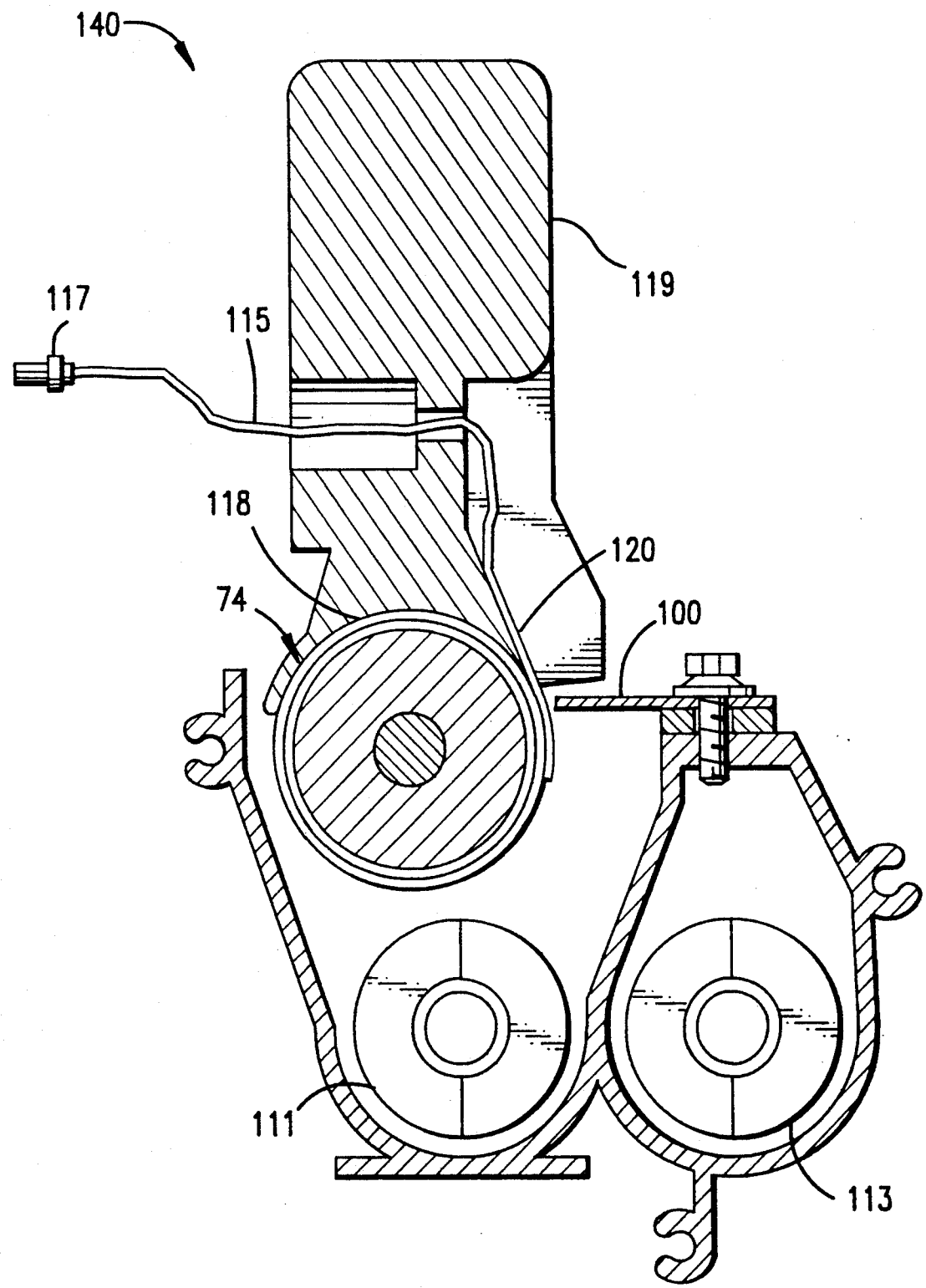
FIG. 3 is a schematic view of a developer sump having a magnetic roll and trim bar, with a flexible sensor for measuring the gap therebetween.

In two component developing, the toner can be comprised of small polymer or resin particles and a coloring agent. The carrier can be comprised of roughly spherical particles or beads. The toner and carrier are mixed together in a developer sump. As can be seen in FIG. 2, a mixing device such as mixing wheel 104 is used to mix the toner and carrier particles together as well as to charge the toner and carrier particles with opposite charges. The electrostatic charge formed between the toner and carrier particles causes the toner to cling to the carrier beads. In FIG. 3, two mixing augers 111, 113 are used for triboelectrification in the developer sump in the place of mixing wheel 104 in FIG. 2.

The developer material (the mixture of toner and carrier) are brought close to the surface of a photographic imaging member with the latent image formed thereon. When brought close to the surface, the toner particles are attracted to the charges on the photoreceptor surface. A roller, such as magnetic roller 74, moves the developer to the photoreceptor surface, as well as moves remaining developer after contact with the photoreceptor surface back into the developer sump. A toner dispensing brush or auger 106 dispenses additional toner into the developer sump as the toner is used up due to a traction of toner particles 102 to photoreceptor surface 12.

In magnetic roll developing, a hollow tube or roll 74 containing fixed magnets is used to move the developer to the photoreceptor. As the magnetic roll rotates around the magnets and through the sump of developer material, the magnets attract metallic carrier beads in the developer. The carriers closest to the roller become magnetized enabling more carrier beads to become attracted. As a result, the developer builds up to form bristles, otherwise known as a magnetic brush.

The magnetic force on the magnetic roll is just enough to allow the developer to build-up on the roll and has little effect on the charge either on the toner or the photoreceptor. As the magnetic roll 74 rotates, it moves the developer brush past a trim bar 100. The trim bar 100 limits the length of the magnetic brush by knocking off the portions of the bristles that extend beyond a predetermined length. It is necessary that this length be exact so as to assure good print quality.

Due to the location of the developer sump within the electrophotographic printing machine, it is difficult to measure the distance between the magnetic roll 74 and trim bar 100 in order to accurately set the distance therebetween. As can be seen in FIG. 3, according to the present invention, a flexible sensor 120 is passed into the developer sump between magnetic roll 74 and trim bar 100. The flexible sensor is within a portable measuring device 140 having a handle 119. When the magnetic roll 74 is exposed within the electrophotographic printer (e.g. by removal of an air/vacuum duct), measuring device 140 is placed on magnetic roll 74. Measuring device 140 has a semi-cylindrical concave portion 118 which allows it to fit securely on roll 74. The surface of concave portion 118 should be smooth (e.g. by machining) to avoid any damage to roll 74. Portable measuring device 140 must be of sufficient weight to sit securely on magnetic roll 74 without relative movement therebetween, but the material from which device 140 is made should not be magnetic. A preferred material for the manufacture of measuring device 140 is non-magnetic stainless steel.

To measure the distance between the magnetic roll and the trim bar, the magnetic roll is first exposed in the electrophotographic printer. After the measuring device is placed on the roll, the measuring device is rotated through a certain angle along with the roll so that the flexible sensor (magnetically adhering to the roll) is positioned adjacent the trim bar. The capacitor part of the sensor and the circuitry for manipulating the signal from the sensor are readily commercially available from Capacitec, Inc. (Ayer, Mass.) under the name CAPACITEC® Capacitive Displacement System. The capacitor of the present invention has a metal laminate applied thereon and measures the gap between the surface of the capacitor and the edge of the trim bar. Because the trim bar distance from the surface of the magnetic roll varies slightly along the edge of the trim bar, the maximum value of the measured distance is held. A connector 117 for connecting to an output terminal, is connected to flexible sensor 120 via extension cable 115. The output terminal, such as a smart 4100-CQ-RS232, displays the measurements of the flexible sensor.

Figure 4:
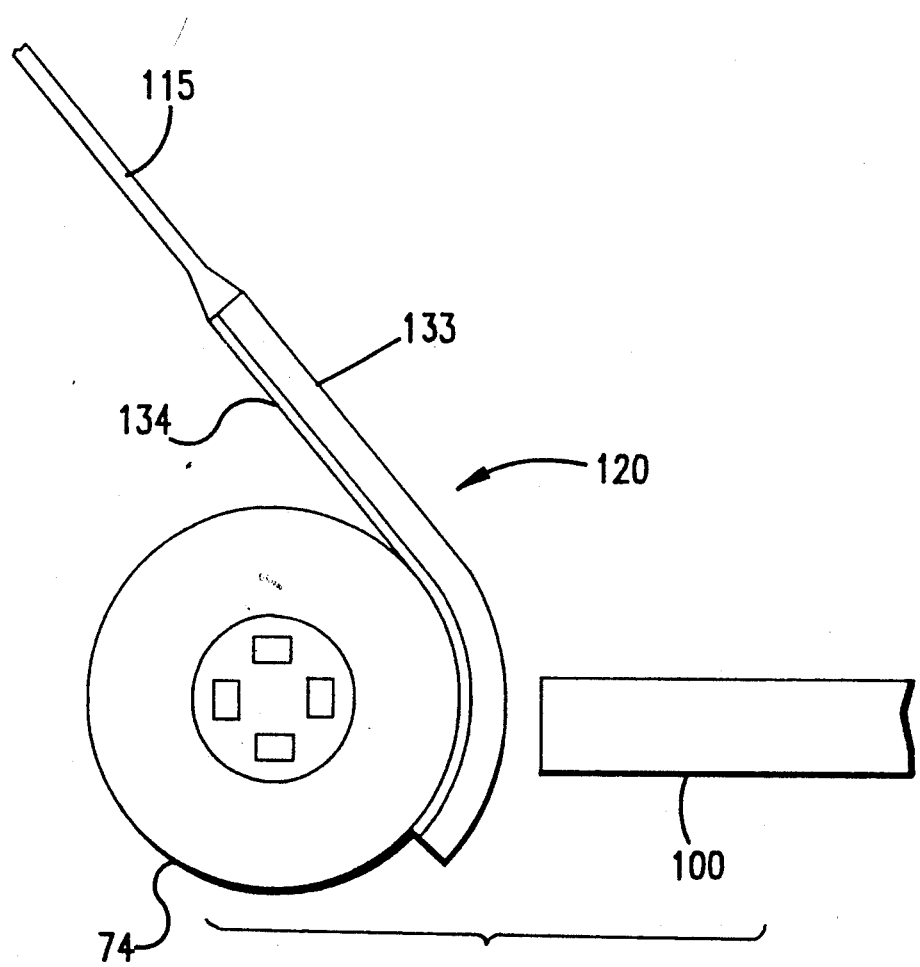
FIG. 4 is a schematic close-up view of the magnetic roller, trim bar and sensor.

As can be seen in FIG. 4, the flexible sensor 120 is comprised of a capacitor 133 and magnetic metal laminate 134. The magnetic metal laminate can be flexible steel shim stock. The flexible sensor 120 is passed into the developer sump and rests on magnetic roll 74. Due to magnetic metal laminate 134, the sensor is magnetically attached to the circumference of the magnetic roll 74. The signal from the capacitor is manipulated to produce a sinusoidal signal proportional to the gap seen by the sensor. The capitance of the sensor is converted to an output voltage which is sent to the output terminal and converted to a linear distance.

The gap between the trim bar 100 and magnetic roll 74 is on the order of about 0.5 to about 0.8 millimeters in the developer subsystem. Due to the functional tolerances of 0.063 millimeters, it is necessary to carefully set and control the gap width. The capacitance sensor, which can be on the order 0.42 millimeters in width, measures the distance between itself and the edge of the trim bar, the distance between the trim bar and magnetic roll being thus determined based on the width of the flexible sensor (including metal laminate).

While the invention has been described with reference to particular preferred embodiments, the invention is not limited to the specific examples given, and other embodiments and modification can be made by those skilled in the art without departing from the spirit and scope of the invention and the claims. For example, the flexible sensor can be used to measure the distance between the magnetic roll and other adjacent members, such as other rollers. In addition, the sensor can be used in conjunction with other rolls having magnetic properties other than the magnetic roller in the developer sump. The sensor can be used in the manufacturing process for originally setting the magnetic roll - trim bar gap distance, as well as for diagnostic purposes such as trouble shooting in the user environment.

We claim:

1. A method of measuring the gap between a magnetic roller and an adjacent member, comprising the steps of:
   positioning a flexible sensor having a magnetic metallic laminate between said roller and said adjacent member such that said sensor is magnetically attracted to said roller and conforms to the circumference of the roller when said sensor is positioned between said roller and adjacent member; and
   measuring the distance between said roller and said adjacent member using said sensor located in the gap.

2. The method of claim 1, wherein said flexible sensor comprises a capacitance sensor.

3. The method of claim 1, wherein said adjacent member is a trim bar.

4. The method of claim 1, wherein the sensor is positioned within a seating member for seating on said roller such that the seating member and roller are rotated together for passing the sensor between the roller and adjacent member.

5. The method of claim 1, wherein the seating member is comprised of non-magnetic stainless steel.

6. The method of claim 1, wherein said metallic laminate comprises steel.

7. A method of measuring a gap between a roller and an adjacent member in an electrophotographic printing machine comprising the steps of:
   providing a seating member comprising a sensor;
   placing said seating member on said roller;
   rotating said roller along with said seating member to insert said sensor between said roller and the adjacent member; and
   measuring the distance between the roller and the adjacent member using said sensor.

8. The method of claim 7, wherein said seating member has a semi-cylindrical concave portion for closely fitting with the surface of said roller.

9. The method of claim 8, wherein the concave portion has a smooth surface for avoiding damage to the roller.

10. The method of claim 7, wherein the seating member comprises non-magnetic stainless steel.

11. The method of claim 7, wherein said sensor is a flexible capacitor sensor.

12. The method of claim 7, wherein the step of passing said sensor comprises rotating said seating member along with said roller such that said sensor passes between said roller and said adjacent member.

13. The method of claim 7, wherein said roller is a magnetic roller and said sensor comprises a magnetic metal laminate.

14. The method of claim 13, wherein in said passing step, said sensor is magnetically attracted to said roller, conforms to the circumference of said roller, and rotates along with said roller adjacent said adjacent member.

15. The method of claim 7, wherein said adjacent member is a trim bar.

16. The method of claim 13, wherein said metal laminate comprises steel.

17. The method of claim 7, wherein said measuring step comprises:
   measuring the distance between said sensor and said adjacent member; and
   adding to said measured distance the thickness of said sensor to arrive at a total distance between said roller and said adjacent member.

18. The method of claim 7, wherein the maximum value measured by said sensor is recorded.

19. The method of claim 7, wherein said seating member is portable and comprises a carrying handle.

20. A measuring device for measuring the distance between a magnetic roller and a trim bar in a developer sump of an electrophotographic printing machine comprising:
   a seating member having a semi-cylindrical concave portion for seating on the magnetic roller to rotate therewith, the semi-cylindrical portion having a radius of curvature the same as that of the magnetic roller;
   wherein said seating member comprises a measuring means positioned between said roller and trim bar upon rotation of said sensor for measuring the distance between said magnetic roller and said trim bar.

21. The measuring device of claim 20, wherein said seating member comprises non-magnetic stainless steel.

22. The measuring device of claim 20, wherein the concave portion of the seating member has a smooth surface for avoiding damage to the magnetic roller.

23. The measuring device of claim 20, wherein said measuring means comprises a flexible capacitor sensor.

24. The measuring device of claim 23, wherein said sensor comprises a magnetic metal laminate.

25. The measuring device of claim 24, wherein said sensor is sufficiently flexible to be magnetically attracted to said roller, conform to the circumference of said roller, and rotate along with said roller adjacent said trim bar.

26. The measuring device of claim 24, wherein said metal laminate comprises steel.

27. The measuring device of claim 20, wherein said seating member is portable and comprises a carrying handle.

28. A measuring device for measuring the distance between a magnetic roller and a trim bar in a developer sump of an electrophotographic printing machine, comprising:

a seating member for seating on said magnetic roller and rotatable therewith, said seating member comprising a capacitance sensor;

wherein said capacitance sensor is flexible and comprises a magnetic metal laminate layer thereon for magnetically attracting and conforming the capacitance sensor to the magnetic roller during measuring.

29. The measuring device of claim 28, wherein said seating member has a semi-cylindrical concave portion for closely fitting with the surface of said magnetic roller.

30. The measuring device of claim 29, wherein the concave portion has a smooth surface for avoiding damage to the roller.

31. The measuring device of claim 28, wherein the seating member comprises non-magnetic stainless steel.

32. The measuring device of claim 28, wherein said sensor is sufficiently flexible to be magnetically attracted to said roller, conform to the circumference of said roller, and rotate along with said roller adjacent said trim bar.

33. The measuring device of claim 28, wherein said metal laminate layer comprises steel.

34. The measuring device of claim 28, wherein said seating member is portable and comprises a carrying handle.

* * * * *